(12) United States Patent
Gardella et al.

(10) Patent No.: US 9,031,925 B2
(45) Date of Patent: May 12, 2015

(54) HADOOP ACCESS VIA HADOOP INTERFACE SERVICES BASED ON FUNCTION CONVERSION

(71) Applicants: William Gardella, Saratoga, CA (US); Christof Bornhoevd, Belmont, CA (US); Zorica Caklovic, Palo Alto, CA (US); Dewei Sun, San Jose, CA (US); Nanhong Ye, San Jose, CA (US); Curtis Huang, San Jose, CA (US)

(72) Inventors: William Gardella, Saratoga, CA (US); Christof Bornhoevd, Belmont, CA (US); Zorica Caklovic, Palo Alto, CA (US); Dewei Sun, San Jose, CA (US); Nanhong Ye, San Jose, CA (US); Curtis Huang, San Jose, CA (US)

(73) Assignee: SAP SE, Walldorf (DE)

( * ) Notice: Subject to any disclaimer, the term of this patent is extended or adjusted under 35 U.S.C. 154(b) by 126 days.

(21) Appl. No.: 13/713,761

(22) Filed: Dec. 13, 2012

(65) Prior Publication Data
US 2014/0172809 A1  Jun. 19, 2014

(51) Int. Cl.
*G06F 17/30* (2006.01)
(52) U.S. Cl.
CPC .............................. *G06F 17/30575* (2013.01)
(58) Field of Classification Search
CPC ................................................ G06F 17/30575
USPC .................. 707/705, 737, 827; 709/203, 208; 717/151
See application file for complete search history.

(56) References Cited

U.S. PATENT DOCUMENTS

2010/0306286 A1* 12/2010 Chiu et al. ..................... 707/827
2014/0047422 A1*  2/2014 Ravi et al. ..................... 717/151

OTHER PUBLICATIONS

Christopher Y. Chung et al., Real-Time Big Data Applying SAP HANA®, Apache Hadoop, and IBM® GPFS™ to Retail Point-of-Sale and Web Log Data, Google, Dec. 2006, 20 pages.*
Konstantin Shvachko et al., The Hadoop Distributed File System, 2010, IEEE, 1-10.*
Prashant Sethia et al., A multi-agent simulation framework on small Hadoop cluster, 2011, 1120-1127.*
SAP, "SAP HANA Database for Next-Generation Business Applications and Real-Time Analytics", 2012, 18 pages.
SAP, "SAP Hana Platform—Technical Overview", 2012, 20 pages.

* cited by examiner

*Primary Examiner* — Jean B Fleurantin
(74) *Attorney, Agent, or Firm* — Brake Hughes Bellermann LLP

(57) ABSTRACT

The present description refers to a computer implemented method, computer program product, and computer system for receiving a resource request at an in-memory database platform that includes an application server and an in-memory database, generating a Hadoop connection function call based on the resource request, forwarding the Hadoop connection function call to a function call conversion service, identifying which of a plurality of Hadoop interface services correspond to the Hadoop connection function call, generating a Hadoop interface service function call corresponding to the Hadoop connection function call based one or more parameters included in the Hadoop connection function call, and forwarding the Hadoop interface service function call to the identified Hadoop interface service to initiate processing by a Hadoop cluster.

22 Claims, 3 Drawing Sheets

HADOOP ACCESS VIA HADOOP INTERFACE SERVICES BASED ON FUNCTION CONVERSION

TECHNICAL FIELD

This description is directed generally to in-memory database systems and Hadoop distributed processing systems, and in particular, to a computer-implemented method, apparatus, and computer program product for Hadoop access via Hadoop interface services based on a function conversion.

BACKGROUND

An in-memory database system (IMDS) is typically a database management system that stores all, or at least most, data in main memory while storing the data on disk or SSD for durability and recovery reasons. This contrasts to traditional on-disk database systems. Because working with data in-memory is much faster than reading data from and writing data to disk systems, the IMDS can typically perform data management functions much faster and with more predictable response times than traditional database systems.

Hadoop is a distributed processing platform that allows data-intensive operations to be processed in a distributed fashion. A Hadoop cluster commonly includes a master node and a group of worker nodes. A job request may be divided into a plurality of tasks, and the tasks may be distributed to a group of worker nodes within the Hadoop platform to be processed in parallel.

SUMMARY

In one general aspect, a computer program product is provided. The computer program product is tangibly embodied on a computer-readable storage medium and includes executable code that, when executed, is configured to cause at least one data processing apparatus to receive a resource request at an in-memory database platform that includes an application server and an in-memory database, generate a Hadoop connection function call based on the resource request, forward the Hadoop connection function call to a function call conversion service, identifying which of a plurality of Hadoop interface services correspond to the Hadoop connection function call, generate a Hadoop interface service function call corresponding to the Hadoop connection function call based one or more parameters included in the Hadoop connection function call, and forward the Hadoop interface service function call to the identified Hadoop interface service to initiate processing by a Hadoop cluster.

In another general aspect, a computer implemented method is provided that includes receiving a resource request at an in-memory database platform that includes an application server and an in-memory database, generating a Hadoop connection function call based on the resource request, forwarding the Hadoop connection function call to a function call conversion service, identifying which of a plurality of Hadoop interface services correspond to the Hadoop connection function call, generating a Hadoop interface service function call corresponding to the Hadoop connection function call based one or more parameters included in the Hadoop connection function call, and forwarding the Hadoop interface service function call to the identified Hadoop interface service to initiate processing by a Hadoop cluster.

In another general aspect, an apparatus includes an in-memory database platform including an in-memory database system and an application server. The apparatus also includes a Hadoop cluster coupled to the in-memory database platform. The Hadoop cluster includes a plurality of worker nodes and a master node that includes a plurality of Hadoop interface services and a map-reduce engine. The application server is configured to receive a resource request, select one of the in-memory database and the Hadoop cluster for at least partially processing the resource request, send a first function call to the in-memory database system if the in-memory database system is selected for at least partially processing the resource request, and send a Hadoop connection function call, via a function call conversion service, to one of the Hadoop interface services for processing by the Hadoop cluster if the Hadoop cluster is selected for at least partially processing the resource request.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
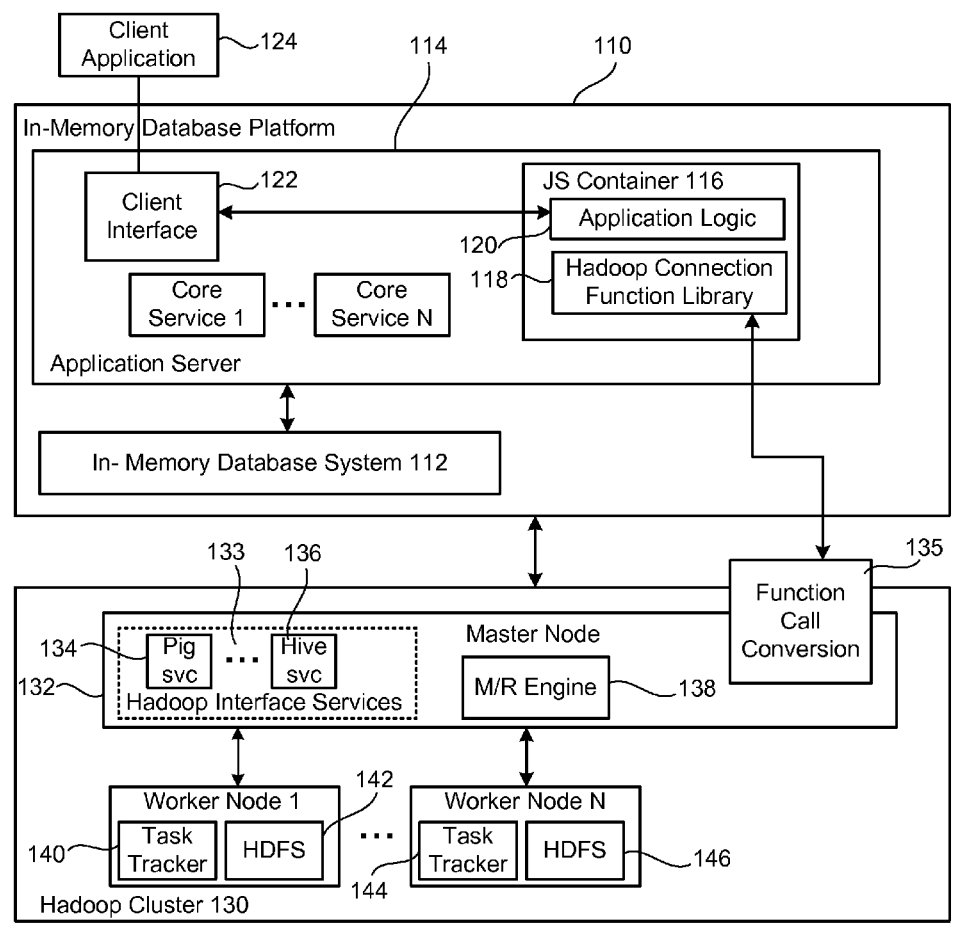
FIG. 1 is a block diagram illustrating a system 100 according to an example implementation.

FIG. 1 is a block diagram illustrating a system 100 according to an example implementation. System 100 includes an in-memory database platform 110 coupled to a client application 124. A Hadoop cluster 130 is coupled to the in-memory database platform 110 and provides distributed processing across multiple database nodes. This architecture illustrated in FIG. 1 for system 100 may allow requests for either in-memory database system processing and/or Hadoop processing to be handled (e.g., received and/or processed) within one system.

According to an example implementation, in-memory database platform 110 may include an in-memory database system 112 to provide in-memory database services, such as rapid storage and retrieval of data from main memory. In-memory database platform 110 may also include an integrated application server 114 that may be integrated with the in-memory database system 112. By application server 114 being integrated with the in-memory database system 112, this may include for example, a direct inter-process communication between application server 114 and system 112 (e.g., processes of server 114 and system 112 in direct communication and), application server 114 and system 112 located on same computer or server (on same physical machine), use of shared memory between the application server 114 and system 112 (e.g., where both application server 114 and system 112 may read and write to a same memory), and/or the possibility to move processing steps from the application server to in-memory database system 112. These are merely some examples of how application server 114 may be integrated with in-memory database system 112, and other examples may be provided.

Application server 114 may generally provide application-related services, such as, for example, providing web pages to one or more client applications, security/authentication, receiving and processing resource requests and other services. According to an example implementation, application server 114 may include a client interface 122 for providing an interface to client application 124. Client application 124 may include, for example, a web browser or other client application. Client interface 122 may provide services to clients/client applications, such as security and/or authentication services. Client interface 122 may also serve or send web pages to a client (such as to client application 124), and may receive resource (or processing) requests, such as, Hyper-Text Transfer Protocol (HTTP) requests (e.g., HTTP Get requests, or HTTP Post requests), or other requests. The terms resource request and processing request may be used interchangeably herein. Client interface 122 may then forward the resource request to application logic 120, which may be logic or software running as a javascript application running or executing within javascript (JS) container 116, according to one example implementation. Alternatively, resource requests may be received by application logic 120 from other applications running within the application server, e.g., as a javascript application running within JS container 116, or from other applications within application server 114.

After receiving a processing request or a resource request from an application, application logic 120 of application server 114 may issue or send one or more resource requests or function calls that request processing or service, to the in-memory database system 112 and/or the Hadoop cluster 130, depending on what processing is required to fulfill or complete the received resource request. Therefore, application logic 120 may first determine whether a request or function call should be sent to either the in-memory database system 112 and/or the Hadoop cluster 130 to fulfill the received resource request. Such request or function call may then be generated by the application logic 120 and sent to either the in-memory database system 112 or the Hadoop cluster 130 for processing. In some cases, one or more processing steps may be performed by both the in-memory database system 112 and the Hadoop cluster 130 in order to fulfill or complete processing for the initially received resource request from the client. According to an example implementation, after processing is completed, application server 114 may return a result to the requesting application (e.g., client application 124), via client interface 122, in response to the received resource request or processing request.

For example, if the resource request requires processing by the in-memory database system 112, the application logic 120 may issue or send a resource request, e.g., via a function call or other request, to one or more of the core services, such as to core service 1, core service 2 (not shown), and/or core service N within application server 114. The core service that receives the processing request or function call may then perform the requested processing or resource request on or via the in-memory database system 112. For example, some of the core services may provide read and write operations to the in-memory database system 112, and/or to perform other processing, to be performed on or by the in-memory database system 112. For example, in response to a processing request, core service 1 may perform structured query language (SQL) processing or issue a SQL request, e.g., to perform a read from or write to in-memory database system 112.

For example, a HTTP Post request may be received by client interface 122 based on a web page served to client application 124. The Post request may include, as parameters, a first name and a last name entered by a user via client application 124. Application logic 120 may receive the Post request, e.g., forwarded by client interface 122. Application logic 120 may then, for example, store this information (the received first name, last name) in the in-memory database system 112, e.g., by sending a request or function call to one of the core services within application server 114 to store such data, in the event that such data should be stored in the in-memory database system 112. This data (first name and last name) would then be stored in the in-memory database system 112, e.g., via SQL operation performed by one of the core services.

Hadoop cluster 130 may include multiple nodes to provide distributed processing and/or parallel processing and distributed storage of data. In one example implementation, each node (e.g., master nodes and worker nodes) may include a processor, memory, and other related hardware and software. While only one Hadoop cluster 130 is shown, any number of Hadoop clusters may be provided to allow distributed or parallel processing.

In the example shown in FIG. 1, Hadoop cluster 130 may include a plurality or group of (e.g., N) worker nodes, such as worker node 1, worker node 2 (not shown), . . . worker node N, where each node may process and store data, such that the Hadoop cluster 130 can perform distributed or parallel processing on data. Each worker node may include a task tracker to receive and process a task from the map-reduce engine 138 of the master node 132. Each worker node may also include a Hadoop distributed file system (HDFS) to store data, which allows data to be stored in a distributed manner across multiple worker nodes. As an example, worker nodes 1 and N may include task trackers 140 and 144, respectively, and may include Hadoop distributed file systems (HDFSs) 142 and 146, respectively.

In the example shown in FIG. 1, Hadoop cluster 130 also includes a master node 132, which includes a map-reduce (M/R) engine 138. Map-reduce engine 138 may include a job tracker (not shown) for receiving map-reduce jobs from applications, and dividing a job into a number of tasks (or sub-jobs). The map-reduce engine 138 may then distribute the tasks among or to each of the worker nodes, e.g., worker node 1, worker node 2 (not shown), . . . worker node N. Each worker node may then perform the requested task or sub-job, and may store the task results in its respective HDFS. The job tracker of the map-reduce engine 138, in some cases, may then collect the processing results as one or more result files from the worker nodes and may write or store the processing results to application server 114 or to in-memory database system 112. According to one example implementation, the master node 132 may provide or report the processing result back to the client application that submitted the map-reduce job request.

Or, in another example implementation, a callback function may be submitted to master node 132 as a map-reduce job to request that processing results be stored in the in-memory database system 112. Master node 132 may then issue a new set of tasks to each of the worker nodes where the processing results are stored to cause these worker nodes to write or store the processing results directly to the in-memory database system 112. Alternatively, the Hadoop worker nodes may provide the processing results to the application server 114, e.g., via function call conversion 135. Once application server 114 receives the processing results from the Hadoop worker nodes, the application server may send a request to the core services to store these processing results in the in-memory database system 112. Thus, the processing results from the Hadoop worker nodes may be stored in the in-memory database system 112 via application server 114.

According to an example implementation, one or more Hadoop interface services 133 may be provided that may provide applications with access to Hadoop services, while, at least in some cases, abstracting some of the details of Hadoop, for example. Two example Hadoop interface services 133 include a Pig service 134 and a Hive service 136.

Pig service 134 is a service built on top of Hadoop which abstracts some of the details of Hadoop from an application. Pig service 134 receives requests written in a language known as "Pig Latin," and may generate one or more map-reduce jobs based on received Pig commands or Pig requests written in Pig Latin. In some cases, a collection or group of Pig requests or commands can be performed as one map-reduce job, for example. Pig Latin abstracts the details of the map-reduce requests into a higher level language, so that it may be easier for applications to submit requests for Hadoop processing via the Pig service 134.

Hive service 136 is a data warehouse service built on top of the Hadoop cluster 130 which facilitates querying and managing large datasets residing in a distributed file system. For example, with Hive service 136, structured data in HDFS can be modeled as relational tables and Hive service 136 can perform structured query language (SQL)-like operations on them with multiple chained map-reduce jobs. Hive service 136 may receive requests, which may be known as Hive queries or a Hive Query Language (Hive QL) requests, for example.

According to an example implementation, a Hadoop connection function library 118 is provided within or on application server 114 that includes a group or library of Hadoop connection functions. Hadoop connection function library 118 provides a connection between one or more applications (e.g., applications which may be running within JS container 116, or application logic 120, or other applications) and the Hadoop interface services 133 (e.g., Pig service 134, Hive service 136) without requiring the application to know all of the details of the underlying Hadoop interface services 133. Thus, some of the specific details of Hive service 136 or Pig service 134 (and other Hadoop interface services 133) may be abstracted or hidden from an application by calling one or more functions of the Hadoop connection function library 118, instead of directly submitting Hive requests or Pig requests to Hive service 136 or Pig service 134, respectively.

The Hadoop connection function library 118 is a collection or library of connection functions provided in javascript or other language. Each connection function in the connection function library 118 may map to a corresponding Hive request or Pig request. Therefore, to allow an application to access Hive/Pig services (or to access Hadoop services via Pig service/Hive service), an application or application logic 120 may generate a Hadoop connection function call, which is a call to one of the connection functions in the Hadoop connection function library 118. This may allow an application within application server 114, or application logic 120, to obtain access to services of Hadoop cluster 130 via Pig service 134 or Hive service 136 by issuing a call to a connection function written in javascript (or other language) without the requesting application or application logic 120 needing to know all of the details of Pig service 134 or Hive service 136, and e.g., without requiring to the requesting application/application logic 120 to handle any errors from such Hive/Pig services. The connection function library 118 also allows an application, or application logic 120, to issue or send processing requests (or resource requests) to either the in-memory database system 112 (e.g., by sending a processing request or function call to one of the core services) and/or send a request for processing by the Hadoop cluster 130 by generating and sending a Hadoop connection function call to function call conversion service 135.

In response to receiving a Hadoop connection function call (e.g., from application logic 120 or an application running within JS container 116 or elsewhere within application server 114), the Hadoop connection function library 118 may forward the Hadoop connection function call to function call conversion service 135. According to an example implementation, function call conversion service 135 may be a program or logic that may, for example, reside or run/execute on master node 132, or other node or location. According to an example implementation, function call conversion service 135 may convert the received Hadoop connection function call to a corresponding Hadoop interface service function call, e.g., based on one or more parameters (such as function name and other parameters) of the received Hadoop connection function call. A Hadoop connection function call may include the name of the Hadoop connection function, and one or more additional parameters. For example, function call conversion service 135 may convert the received Hadoop function call to a corresponding Pig request or Hive request. In other words, by performing such function call conversion, function call conversion service 134 may generate a Hadoop interface service function call (e.g., Pig request or Hive request) based on a received Hadoop connection function call.

For example, a Hadoop connection function call may be written as: Hadoop_connection_function_name (parameter1, parameter2, parameter3), wherein Hadoop_connection_function_name is a name of the Hadoop connection function, and parameter1, parameter2 and parameter3 are additional parameters of this function call. The function call conversion service 135 may generate a corresponding Pig or Hive function call, such as: Pig_function_name (parameter2, parameter3, parameter4), where two of the three parameters of the Hadoop function call (parameter2 and parameter3) are also parameters of the corresponding Pig function call, but parameter4 is a new parameter (parameter4 is not present or not provided via the Hadoop connection function call). Function call conversion 135 may also handle any errors that may be generated by the Pig service 134 or Hive service 136.

Function call conversion service 135 then forwards the generated Hadoop interface service function call (e.g., Pig function call, or Hive function call) to the identified or corresponding Hadoop interface service. For example, a generated Pig function call or Pig request would be forwarded to the Pig service 134, while a generated Hive function call or Hive request would be forwarded to the Hive service 136.

The receiving Hadoop interface service (e.g., Pig service 134 or Hive service 136) may then generate a map-reduce job (or one or more map-reduce jobs) based on the received Hadoop interface service function call. For example, Hive service 136 may generate a map-reduce job for each received Hive function call or Hive request received from function call conversion service 135. Similarly, Pig service 134 may generate a map-reduce job for each received Pig function call or each Pig request from function call conversion service 135. Alternatively, Pig service 134 may receive multiple Pig function calls or multiple Pig requests, and may generate just one or two map-reduce jobs based on a group of, e.g., 4, 5, 6, ... Pig function calls or Pig requests, since Pig service 134 may have the capability of combining multiple Pig requests into a single map-reduce job, according to an example implementation.

As noted, a map-reduce engine 138 of master node 132 may receive the map-reduce job from the Pig service 134 or Hive service 136. The map-reduce engine 138 may then divide the map-reduce job into a plurality of tasks, and then distribute the tasks to each of a plurality of worker nodes. The result file (or result files that are generated by worker nodes processing the tasks) may then be returned to the function call conversion service 135, the application logic 120, the in-memory database system 112, and/or the application server 114, as examples. According to an example implementation, a callback function call may be sent by the function call conversion service 135 to one of the Hadoop interface services 133 requesting that the processing result file be stored directly into the in-memory database system 112, e.g., where the function call may identify an address, a table, or a resource location where the result file should be stored in the in-memory database system 112. In this example, after processing the tasks for the map-reduce job, the worker nodes may write or store their result files in the in-memory database system 112, e.g., in the location or file identified by the callback function.

An example will now be described that may involve accesses to both the in-memory database system 112 and the services of the Hadoop cluster 130 via the Hadoop interface services 132. According to an example, an HTTP request may be received by client interface 122 from client application 124 (e.g., web browser) that includes a user's first name and last name. The HTTP request is forwarded to the application logic 120. Application logic 120 then issues a read request to the core services to perform a table lookup in the in-memory database system 112 to obtain a user_ID (or user identification number) associated with the user's name (first name, last name) received in the HTTP request. The core services submit a SQL request to the in-memory database system 112 to obtain the user_ID corresponding to the user's first name and last name. The user_ID is then returned by the in-memory database system 112 to the application logic 120 via the core services.

Next, according to an illustrative example, one or more requests for Hadoop processing may be sent by application logic 120 to one or more of the Hadoop interface services 133 in order for the application logic 120 to obtain from the Hadoop cluster 130 a list of product IDs for top 10 recommended products for the user associated with the received user_ID. For example, application logic 120 may generate and send one or more, or even a group (or plurality) of Hadoop function calls, to the Hadoop connection function library 118. The Hadoop connection function library 118 may then forward each of the Hadoop connection function calls to the function call conversion service 135.

For example, application logic 120 may generate and submit, via the Hadoop connection function library 118, a group (or plurality) of Hadoop connection function calls to the function call conversion service 135 including the four example Hadoop connection function calls listed below in Table 1. According to an example implementation, function call conversion service 135 may then generate a corresponding Pig Latin function call (or Pig request) for each of the four Hadoop connection function calls, which are sent to Pig service 134, so that Hadoop cluster 130 can perform one or more requested functions.

TABLE 1

Example Function Conversion from Hadoop Connection Function to Corresponding Pig Latin Function

| Example Hadoop Connection Function call (forwarded by Hadoop connection function library 118) | Example Pig Latin Function call (generated by function call conversion service 135) |
| --- | --- |
| 1. createpiginnerjoin (cjoin, user_IDs_table (UID), user's_product_review_table (userID) | cjoin = join user_IDs_table by UID, user's_product_review_table by user_ID |
| 2. createpiglimit (user_IDs_table, cat_top, 10) | cat_top = limit cjoin by 10 |
| 3. createpigstoreDB (cat_top, dest_table_location) | store cat_top into dest_table_location [URL to destination table in in-memory database system 112 to store cat_top] |
| 4. executepig (displayresult) | Run |

As part of this example, the Hadoop cluster 130 may periodically and/or continuously determine and maintain one or more tables that may, together, be used to determine a list of top 10 recommended products for the user_ID, as an illustrative example. For example, Hadoop cluster 130 may maintain and periodically update a user_IDs_table that identifies a group of similar users for each user_ID based upon users that have submitted similar product reviews as the user of the user_ID (e.g., submitted product reviews having similar star ratings for the same product). Hadoop cluster 130 may also determine and periodically update a table that identifies a user's_product_review_table that identifies products purchased and rated/reviewed by each user_ID, where, for example, this table may include highest rated products (which have been rated by the user/user_ID) at the top of the table for each user_ID, and lower rated products at the bottom of the table. These are merely examples of the type of data that may be stored and periodically updated within the Hadoop cluster 130, and many other types of information may be stored or processed within a Hadoop cluster. The four example Hadoop function calls listed in Table 1 will be briefly described. The first Hadoop connection function call, createpiginnerjoin (cjoin, user_IDs_table (UID), user's_product_review_table (userID), is a request to join the two tables (user_IDs_table, user's_product_review_table) based on the common field, user_ID. Based on the mapping shown in Table 1 for this Hadoop connection function, function call conversion service 135 generates the corresponding Pig Latin function call as cjoin=join user_IDs_table by UID, user's_product_review_table by user_ID, which causes the Hadoop cluster 130 to join these two tables based on user_ID. The result of this table join operation is a table, which may be temporarily referred to as cjoin, which includes product IDs for products that are recommended to each user_ID, based on similar users or similar product reviews.

The cjoin table, listing recommended products for each user_ID, may have many, e.g., hundreds, of recommended products for each user_ID. Therefore, application logic 120 sends, via Hadoop connection function library 118, the second Hadoop connection function, createpiglimit (user_IDs_table, cat_top, 10), which is a function call to limit the output of the previous function to the top 10 values. Function call conversion service 135 then generates the corresponding Pig Latin function call (or Pig request) as cat_top=limit cjoin by 10, which requests the Pig service 134 to limit the cjoin table to the top 10 product IDs. Therefore, the resulting table, cat_top, will include the product IDs of the top ten recommended products for each user_ID. Thus, for this second function call, the reference name (cat_top) is passed as a parameter of the second Hadoop connection function call and is used as the reference name of the corresponding Pig Latin function call. Also, the number 10 (indicating that only the top 10 product IDs should be provided for each user_ID in the result file) is also included in the corresponding Pig Latin function call (limit cjoin by 10).

Next, application logic 120 sends to function call conversion service 135, via Hadoop connection function library 118, the third Hadoop connection function, createpigstoreDB (cat_top, dest_table_location), which is a request to store the cat_top table (listing top 10 product IDs for each user_ID) in a location (dest_table_location) within in-memory database system 112. This third Hadoop connection function call is converted by function call conversion service 135 to a corresponding Pig Latin function call or Pig request as store cat_top into dest_table_location. This may be considered a callback function which may cause the worker nodes which have stored the resulting cat_top table (listing top 10 product IDs for each user_ID) in their HDFS to store their cat_top result tables directly in the in-memory database system 112 at the location identified by the URL (uniform resource locator) specified by dest_table_location. Or, alternatively, the third Hadoop connection function, createpigstoreDB (cat_top, dest_table_location), may cause worker nodes to return their cat_top result tables to application server 114, and then application server 114 may issue a write request (to core services (e.g., where the write request identifies the write location as dest_table_location), which causes the received cat_top result tables to be written to in-memory database system 112 at the specified memory/storage location (dest_table_location). Thus, the parameter "dest_table_location" included in the third Hadoop connection function call is passed as a parameter of the corresponding Pig Latin function call or Pig request. Thus, in some cases, one or more parameters included in a Hadoop connection function call are included in the corresponding Pig or Hive request. In this manner, for some function names or reference names for a function, and for some function parameters, the Hadoop connection function calls may provide or encapsulate these parameters which may then be used by the function call conversion service 135 to generate the corresponding Pig/Hive request or included within the corresponding Pig/Hive request, for example.

Application logic may then generate and send a fourth Hadoop connection function as executepig (displayresult), which is a request to have Pig service 134 execute or run the group of three previously submitted requests, and then display/store the results as requested (e.g., direct write result file back to in-memory database system 112). Function call conversion service 135 may then generate the corresponding Pig Latin function call or Pig request as run, which causes the Pig service 134 to combine the four Pig requests, and generate one or maybe two map-reduce jobs to perform the operations requested by these 4 function calls. The map-reduce engine 138 may then divide this job into a plurality of tasks, and the tasks are distributed to the worker nodes. Per the callback function of the third function call, the resulting files are stored by the worker nodes, e.g., via application server 114 and core services, in the designated location within the in-memory database system 112, in this example.

Function call conversion service 135 is notified by Pig service that the Pig execute/run request has been completed, and function call conversion service 135 then notifies the application logic 120 that these Pig request(s) have been processed. Application logic 120 then sends a request to core services to identify the top 10 product IDs for the received user_ID (corresponding to the received first name, last name from the client application). Alternatively, the result file stored in the in-memory database system 112 simply identifies the product IDs for the top 10 products corresponding to the user_ID. In this example, application logic 120 may then issue a request via core services to the in-memory database system 112 to provide product information (e.g., product description, picture, price information, . . . ) for each of the 10 product IDs. This information is returned by the in-memory database system 112 to the application logic 120 via the core services.

Application logic then provides this product information for these top 10 products to the client interface 122. Client interface 122 may then generate and serve a web page to client application 124 that displays or provides this product information for the top 10 recommended products for this user (e.g., corresponding to the user_ID of this user). This information is then displayed to the user.

Figure 2:
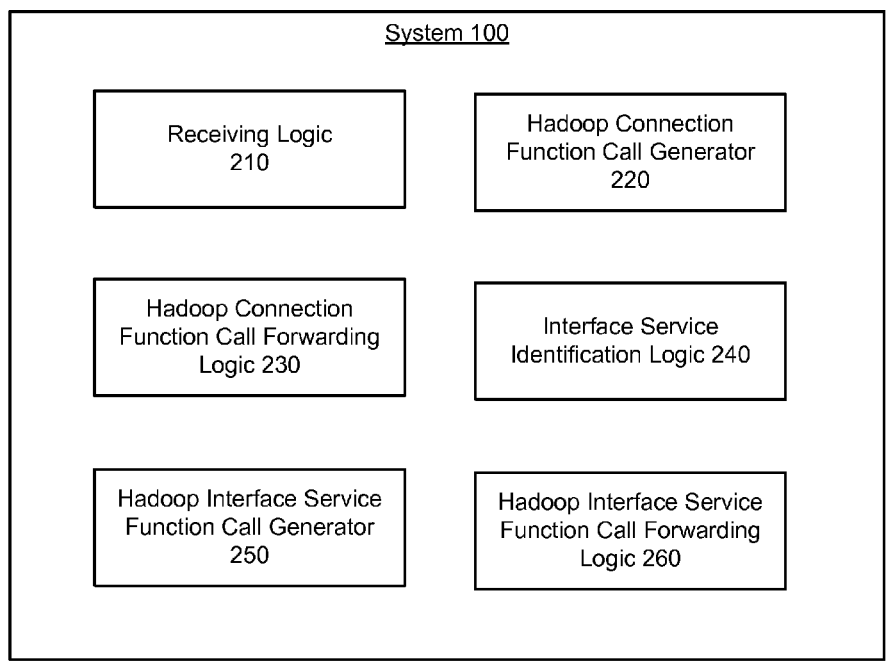
FIG. 2 is a block diagram of a system 100 according to an example implementation.

FIG. 2 is a block diagram of a system 100 according to an example implementation. Receiving logic 220 (e.g., client interface 122) is configured to receive a resource request at an in-memory database platform that includes an application server and an in-memory database. Hadoop connection function call generator 220 (e.g., application logic 120) is configured to generate a Hadoop connection function call based on the resource request. A Hadoop connection function call forwarding logic 230 (e.g., Hadoop connection function library 118) is configured to forward the Hadoop connection function call to a function call conversion service (e.g., 135). An interface service identification logic (e.g., function call conversion service 135) is configured to identify which of a plurality of Hadoop interface services (e.g., Pig service 135, Hive service 136) correspond to the Hadoop connection function call. A Hadoop interface service function call generator 250 (e.g., function call conversion service 135) is configured to generate a Hadoop interface service function call corresponding to the Hadoop connection function call based one or more parameters included in the Hadoop connection function call. A Hadoop interface service function call forwarding logic 260 (e.g., function call conversion service 135) is configured to forward the Hadoop interface service function call to the identified Hadoop interface service to initiate processing by a Hadoop cluster.

Figure 3:
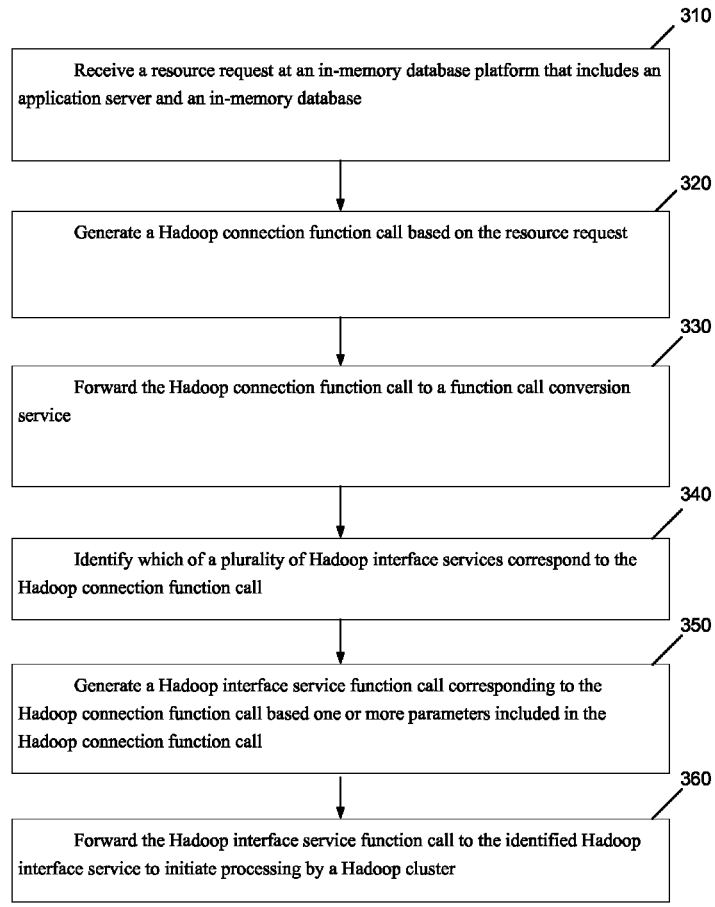
FIG. 3 is a flow chart illustrating operation of a system 100 according to an example implementation.

FIG. 3 is a flow chart illustrating operation of a system 100 according to an example implementation. At 310, a resource request is received at an in-memory database platform (e.g., 110) that includes an application server (e.g., 114) and an in-memory database (e.g., 112). At 320, a Hadoop connection function call is generated (e.g., by application logic 120 or an application) based on the resource request. At 330, the Hadoop connection function call is forwarded (e.g., by Hadoop connection function library 118) to a function call conversion service (e.g., 135).

At 340, it is identified (e.g., by function call conversion service 135) which of a plurality of Hadoop interface services correspond to the Hadoop connection function call. For example, identifying the Hadoop interface service that corresponds to the received Hadoop connection function call may be performed based on a function name of the received Hadoop connection function that is called, since each Hadoop connection function name may map to either a Pig function call (Pig request), or a Hive function call (Hive request), for example. Therefore, the function name of the Hadoop connection function call may map to, or may be used to identify, either the Pig service 134 or the Hive service 136 (or other Hadoop interface service).

At 350, a Hadoop interface service function call is generated (e.g., by function call conversion service 135) corresponding to the Hadoop connection function call based one or more parameters included in the Hadoop connection function call. At 360, the Hadoop interface service function call is forwarded (e.g., by function call conversion service 135) to the identified Hadoop interface service to initiate processing by a Hadoop cluster.

The method illustrated in FIG. 3 may further include generating, by the identified Hadoop interface service, a map-reduce job based on the Hadoop interface service function call, receiving, by a map-reduce engine of a master node of the Hadoop cluster, the map-reduce job from the identified Hadoop interface service, and, receiving, by the in-memory database from the Hadoop cluster (e.g., via function call conversion service 135 and application server 114), one or more result files from the Hadoop cluster in response to forwarding the Hadoop interface service function call.

The method illustrated in FIG. 3 may further include generating, by the identified Hadoop interface service, a map-reduce job based on the Hadoop interface service function call, receiving, by a map-reduce engine of a master node of the Hadoop cluster, the map-reduce job from the identified Hadoop interface service, dividing, by the map-reduce engine, the map-reduce job into a plurality tasks, and distributing, by the map-reduce engine, the tasks to a plurality of worker nodes in the Hadoop cluster.

In the method illustrated in FIG. 3 the identifying (operation 340) may include identifying, by a function call conversion service, which of a Pig service or a Hive service corresponds to the Hadoop connection function call.

In the method illustrated in FIG. 3, the generating (operation 350) may include generating, by a function call conversion service based on the Hadoop connection function call, a Hive QL request, and wherein the forwarding (operation 360) may include forwarding the Hive QL request to a Hive service. The method may further include generating, by the Hive service, a map-reduce job based on the Hive QL request, and forwarding, by the Hive service, the map-reduce job to a map-reduce engine of a master node of the Hadoop cluster.

In the method illustrated in FIG. 3, the generating (operation 350) may include generating, by a function call conversion service based on the Hadoop connection function call, a Pig request provided in Pig Latin, and wherein the forwarding the Hadoop interface service function call comprises forwarding the Pig request to a Pig service. The method may further include generating, by the Pig service, a map-reduce job based on the Pig request, and forwarding, by the Pig service, the map-reduce job to a map-reduce engine of a master node of the Hadoop cluster.

Implementations of the various techniques described herein may be implemented in digital electronic circuitry, or in computer hardware, firmware, software, or in combinations of them. Implementations may implemented as a computer program product, i.e., a computer program tangibly embodied in a non-transitory machine-readable storage device (e.g., a semiconductor or magnetic material-based storage device), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer implemented method comprising:
receiving a resource or processing request, at an application server including a processor, from a client application running on an in-memory database platform that includes the application server and an in-memory database system, the in-memory database platform being external to and connectable to a Hadoop cluster via a connection function library in the application server;
determining, by the application server, whether the requested resource or processing is available in the in-memory database system;
when the requested resource or processing is available in the in-memory database system, sending the resource or processing request to the in-memory database system; and
when the requested resource or processing is unavailable in the in-memory database system, generating a Hadoop connection function call from the connection function library based on the resource or processing request, and forwarding the Hadoop connection function call to a function call conversion service of the Hadoop cluster,
wherein the function call conversion service of the Hadoop cluster is configured to identify which of a plurality of Hadoop interface services correspond to the Hadoop connection function call,
generate a Hadoop interface service function call corresponding to the Hadoop connection function call based one or more parameters included in the Hadoop connection function call, and
forward the Hadoop interface service function call to the identified Hadoop interface service to initiate processing by a Hadoop cluster.

2. The method of claim 1 further comprising:
generating, by the identified Hadoop interface service, a map-reduce job based on the Hadoop interface service function call;
receiving, by a map-reduce engine of a master node of the Hadoop cluster, the map-reduce job from the identified Hadoop interface service; and
receiving, by the in-memory database system from the Hadoop cluster, one or more result files from the Hadoop cluster in response to forwarding the Hadoop interface service function call.

3. The method of claim 1 further comprising:
generating, by the identified Hadoop interface service, a map-reduce job based on the Hadoop interface service function call;
receiving, by a map-reduce engine of a master node of the Hadoop cluster, the map-reduce job from the identified Hadoop interface service;
dividing, by the map-reduce engine, the map-reduce job into a plurality tasks; and
distributing, by the map-reduce engine, the tasks to a plurality of worker nodes in the Hadoop cluster.

4. The computer implemented method of claim 1 wherein the function call conversion service of the Hadoop cluster is configured to identify which of a Pig service or a Hive service corresponds to the Hadoop connection function call.

5. The computer implemented method of claim 1, wherein the function call conversion service of the Hadoop cluster is configured to generate a Hive QL request and forward the Hive QL request to a Hive service.

6. The computer implemented method of claim 5 wherein the Hive service is configured to generate a map-reduce job based on the Hive QL request and forward the map-reduce job to a map-reduce engine of a master node of the Hadoop cluster.

7. The computer implemented method of claim 1, wherein the function call conversion service of the Hadoop cluster is configured to generate a Pig request provided in Pig Latin and forward the Pig request to a Pig service.

8. The computer implemented method of claim 7, wherein the Pig service is configured to generate a map-reduce job based on the Pig request and forward the map-reduce job to a map-reduce engine of a master node of the Hadoop cluster.

9. A computer program product, the computer program product being tangibly embodied on a non-transitory computer-readable storage medium and including executable code that, when executed, is configured to cause a data processing apparatus to:
receive a resource or processing request, at an in-memory database platform that includes an application server, a processor and an in-memory database system, from a client application running on an in-memory database platform, the in-memory database platform being external to and connectable to a Hadoop cluster via a connection function library;
determine, by the application server, whether the requested resource or processing is available in the in-memory database system;
when the requested resource or processing is available in the in-memory database system, send the resource or processing request to the in-memory database system; and
when the requested resource or processing is unavailable in the in-memory database system, generate a Hadoop connection function call from the connection function library based on the resource or processing request, and forward the Hadoop connection function call to a function call conversion service of the Hadoop cluster,
wherein the function call conversion service of the Hadoop cluster is configured to identify which of a plurality of Hadoop interface services correspond to the Hadoop connection function call, generate a Hadoop interface service function call corresponding to the Hadoop connection function call based one or more parameters included in the Hadoop connection function call, and forward the Hadoop interface service function call to the identified Hadoop interface service to initiate processing by a Hadoop cluster.

10. The computer program product of claim 9 further including code that, when executed, is configured to cause the data processing apparatus to receive, by the in-memory database system from the Hadoop cluster via the application server, one or more result files from the Hadoop cluster in response to forwarding the Hadoop interface service function call.

11. The computer program product of claim 9 further including code that, when executed, is configured to cause the data processing apparatus to:
generate, by the identified Hadoop interface service, a map-reduce job based on the Hadoop interface service function call;
receive, by a map-reduce engine of a master node of the Hadoop cluster, the map-reduce job from the identified Hadoop interface service;
divide, by the map-reduce engine, the map-reduce job into a plurality of tasks; and distribute, by the map-reduce engine, the tasks to a plurality of worker nodes in the Hadoop cluster.

12. The computer program product of claim 9 further including code that, when executed, is configured to cause the data processing apparatus to identify which of a plurality of Hadoop interface services correspond to the Hadoop connection function call and to cause the data processing apparatus to identify, by a function call conversion service, which of a Pig service or a Hive service corresponds to the Hadoop connection function call.

13. The computer program product of claim 9,
wherein the code, when executed, is further configured to cause the data processing apparatus to generate, by a function call conversion service based on the Hadoop connection function call, a Hive Query Language (QL) to forward the Hive QL request to a Hive service.

14. The computer program product of claim 13 wherein the-code, when executed, is further configured to cause the data processing apparatus to:
generate, by the Hive service, a map-reduce job based on the Hive QL request; and
forward, by the Hive service, the map-reduce job to a map-reduce engine of a master node of the Hadoop cluster.

15. The computer program product of claim 9,
wherein the code, when executed, is further configured to cause the data processing apparatus to generate, by a function call conversion service based on the Hadoop connection function call, a Pig request provided in Pig Latin and to forward the Pig request to a Pig service.

16. The computer program product of claim 15 further including code that, when executed, is configured to cause the data processing apparatus to:
generate, by the Pig service, a map-reduce job based on the Pig request; and
forward, by the Pig service, the map-reduce job to a map-reduce engine of a master node of the Hadoop cluster.

17. An apparatus comprising:
an in-memory database platform including an in-memory database system and an application server, the application server including a processor coupled to a memory, the processor and memory forming logic circuitry, the in-memory database platform being external to and connectable to a Hadoop cluster via a connection function library, the application server configured to:
receive a resource or processing request from a client application running on the in-memory database platform;
when the requested resource or processing is available in the in-memory database system, send the resource or processing request to the in-memory database system, send the resource or processing request to the in-memory database system; and
when the requested resource or processing is unavailable in the in-memory database system, generate a Hadoop connection function call from the connection function library based on the resource or processing request, and forward the Hadoop connection function call to a function call conversion service of the Hadoop cluster,
wherein the function call conversion service is configured to identify which of a plurality of Hadoop interface services corresponds to the Hadoop connection function call, convert the Hadoop connection function call to a corresponding Hadoop interface service function call based one or more parameters included in the Hadoop connection function call, and forward the Hadoop interface service function call to the identified Hadoop interface service to initiate processing by the Hadoop cluster.

18. The apparatus of claim 17 wherein the Hadoop cluster includes a plurality of worker nodes and a master node, the master node including a plurality of Hadoop interface services and a map-reduce engine, the identified Hadoop interface service being configured to generate a map-reduce job based on the Hadoop interface service function and the map-reduce engine being configured to:
receive the map-reduce job from the identified Hadoop interface service;
divide the map-reduce job into a plurality of tasks; and
distribute the tasks to a plurality of worker nodes in the Hadoop cluster.

19. The apparatus of claim 18, wherein the plurality of Hadoop interface services includes a Hive service and a Pig service.

20. The apparatus of claim 18, wherein the apparatus is configured to
receive, by the in-memory database system from the Hadoop cluster, one or more result files in response to distributing the tasks to the plurality of worker nodes in the Hadoop cluster.

21. The apparatus of claim 17 wherein the function call conversion service of the Hadoop cluster is configured to convert the Hadoop connection function call to a corresponding Hive Query Language (QL) request and to forward the corresponding Hive QL request to a Hive service.

22. The apparatus of claim 21 wherein the function call conversion service of the Hadoop cluster is configured to convert the Hadoop connection function call to a corresponding Pig request and to forward the corresponding Pig request to a Pig service.

* * * * *